United States Patent
Vercruysse et al.

(10) Patent No.: US 12,071,527 B2
(45) Date of Patent: Aug. 27, 2024

(54) FLAME RETARDANT FILM

(71) Applicant: AGFA-GEVAERT NV, Mortsel (BE)

(72) Inventors: Geert Vercruysse, Mortsel (BE); Hubertus Van Aert, Mortsel (BE); Dirk Quintens, Mortsel (BE); Sarah Richardson, Mortsel (BE); Stefaan Smet, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 281 days.

(21) Appl. No.: 17/767,308

(22) PCT Filed: Sep. 30, 2020

(86) PCT No.: PCT/EP2020/077320
§ 371 (c)(1),
(2) Date: Apr. 7, 2022

(87) PCT Pub. No.: WO2021/069273
PCT Pub. Date: Apr. 15, 2021

(65) Prior Publication Data
US 2022/0363846 A1    Nov. 17, 2022

(30) Foreign Application Priority Data
Oct. 8, 2019    (EP) ..................... 19201981

(51) Int. Cl.
C08J 5/18 (2006.01)
C08J 7/05 (2020.01)
C09D 1/00 (2006.01)
C09D 5/18 (2006.01)

(52) U.S. Cl.
CPC . C08J 5/18 (2013.01); C08J 7/05 (2020.01); C09D 1/00 (2013.01); C09D 5/18 (2013.01); C08J 2367/02 (2013.01)

(58) Field of Classification Search
None
See application file for complete search history.

(56) References Cited

FOREIGN PATENT DOCUMENTS

| EP | 2993039 A1 | 3/2016 |
| JP | 2002-256136 A | 9/2002 |
| JP | 2013-252651 A | 12/2013 |

OTHER PUBLICATIONS

Hibino, JP2002256136A, Sep. 11, 2002 (machine translation) (Year: 2002) (Year: 2002).*
European Patent Office, International Search Report in International Patent Application No. PCT/EP2020/077320, mailed Nov. 27, 2020, 4 pp.
European Patent Office, Written Opinion in International Patent Application No. PCT/EP2020/077320, mailed Nov. 27, 2020, 7 pp.
Thomson Scientific, Database WPI, Week 200316, AN 2003-159876, XP002798567 & JP 2002-256136 A (Sumitomo Bakelite Co. Ltd.), Sep. 11, 2002 (Abstract).
Thomson Scientific, Database WPI, Week 201401, An 2013-X19762, XP002798568 & JP 2013-252651 A (Toray Ind. Inc.), Dec. 19, 2013 (Abstract).

* cited by examiner

*Primary Examiner* — Cheng Yuan Huang
(74) *Attorney, Agent, or Firm* — Leydig, Voit & Mayer, Ltd.

(57) ABSTRACT

A flame retardant film comprising a polyester containing film comprising on a side thereof, a flame retardant layer. The flame retardant layer comprises a colloidal metal oxide in an amount of 6 g/m$^2$ of more, an inorganic binder in an amount of 2 g/m$^2$ or more, a first flame retardant being a phosphorous containing compound in an amount of 10 g/m$^2$ or more and a second flame retardant being a mineral compound selected from the group of aluminum hydroxide, aluminum trihydrate, magnesium hydroxide, magnesium calcium carbonate, hydrated magnesium carbonate, aluminum oxide hydroxide, boron compounds, antimony trioxide and combinations thereof, the amount of the second flame retardant is 6 g/m$^2$ or more.

20 Claims, No Drawings

1

FLAME RETARDANT FILM

CROSS-REFERENCE TO RELATED APPLICATIONS

This patent application is the U.S. national phase of copending International Patent Application No. PCT/EP2020/077320, filed Sep. 30, 2020, which claims the benefit of European Patent Application No. 19201981.8, filed Oct. 8, 2019.

TECHNICAL FIELD

The present invention relates to a flame-retardant polyester film and more specifically a flame-retardant synthetic paper.

BACKGROUND ART

Polyester films are used as magnetic recording materials, electrical insulation materials, capacitor materials, packaging materials, and building materials because of their mechanical characteristics, electrical characteristics, and the like. Furthermore, polyester films are used as various industrial materials for photographic applications, graphic applications, such as synthetic paper, thermal transfer applications, and the like. However, there are problems in that polyester containing films are softened or melt by heat, and are flammable. In particular, when polyester films are used as electrical insulation materials for applications related to adhesive tapes, flexible printed circuits, membrane switches, film heaters, or flat cables, or are used as printable substrates in sign & display applications in buildings, further improvement in the flame retardancy of polyester films have been requested.

With respect to technologies for improving the flame retardancy of polyester films, a method in which a bromine-based, phosphorous-based, inorganic compounds, or other flame retardants are incorporated into a polyester film or a method in which a halogen-containing component or a phosphorous-containing component is subjected to copolymerization has been proposed (for example, Japanese Unexamined Patent Application. Publication No. 10-278206). Bromine-based flame retardants have the disadvantage that HBr is formed. This is a highly toxic substance which can raise further safety concerns in the applications of the product.

Furthermore, in the above mentioned invention, repeated exposure to flame causes enlargement of burning and, therefore, the flame retardancy is inadequate. With respect to these technologies, since the flame retardant is added to the polyester film, or the halogen containing component or the phosphorous-containing component is included in the polyester by copolymerization, the mechanical characteristics inherent in the polyester film are degraded.

Another method has been proposed, in which a flame retardant layer is coated or laminated onto the polyester containing film. This flame retardant layer may contain a resin, e.g., polyamic acid (for example, Japanese Unexamined Patent Application Publication No. 2002-172747) or as described in JP 2013252651A wherein the flame retardant layer contains a thermoplastic polyester resin, a cyclophosphazene compound and an Aluminium or Magnesium hydroxide. The presence of organic binders will decrease the flame retardancy of the flame retardant layer as these organic binders are also highly flammable.

In JP2019035046A, a flame retardant composition was described which contained an inorganic filler and a silicone binder for bonding the inorganic fillers to form a flame retardant molded body. Silicone binders, however, will give the formed flame retardant body or layer a very hydrophobic and hence highly repellent property toward e.g. printing inks, hence making the material unsuitable for graphic applications such as printable synthetic papers.

SUMMARY OF INVENTION

It is the objective of the present invention to provide a flame retardant composition which can be applied upon a polyester containing film, not influencing substantially the mechanical properties of the polyester film and which does not require the presence of an organic binder. The objective has been achieved by providing a polyester containing film comprising a flame retardant layer as defined in claim 1.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

The flame retardant film according to the invention comprises a polyester containing film which has on at least a side thereof, a flame retardant layer. The flame retardant layer comprises a colloidal metal oxide in an amount of 6 g/m$^2$ of more, preferably 10 g/m$^2$ or more, an inorganic binder in an amount of 2 g/m$^2$ or more, preferably 3 g/m$^2$ or more, a first flame retardant being a phosphorous containing compound in an amount of 10 g/m$^2$ or more, preferably 15 g/m$^2$ or more and a second flame retardant being a mineral compound selected from the group of aluminium hydroxide, magnesium hydroxide, magnesium calcium carbonate, hydrated magnesium carbonate, aluminium oxide hydroxide and combinations thereof, the amount of the second flame retardant is 6 g/m$^2$ or more, preferably 9 g/m$^2$ or more.

A. POLYESTER CONTAINING FILM

The polyester containing film can consist of a polyester polymer selected from the group of polyesters of ethylene glycol and terephthalic acid (=polyethylene terephthalate, PET), of ethylene glycol and naphthalene 2,6-dicarboxylic acid (=polyethylene-2,6-naphthalate, PEN), of 1,4-bis-hydroxymethylcyclohexane and terephthalic acid (=poly-1,4-cyclohexanedimethylene terephthalate, PCDT) and from ethylene glycol, naphthalene-2,6-dicarboxylic acid and biphenyl-4,4'-dicarboxylic acid (=polyethylene-2,6-naphthalate bibenzoate, PENBB). Especially preferred are polyesters which are at least 90 mole %, preferably at least 95 mole %, of ethylene glycol and terephthalic acid units or of ethylene glycol and naphthalene-2,6-dicarboxylic acid units. The remaining monomer units are derived from other aliphatic, cycloaliphatic or aromatic diols or dicarboxylic acids.

Suitable polyesters include those produced from aromatic, aliphatic, or cyclo-aliphatic dicarboxylic acids or their esters, the dicarboxylate group having 4 to 20 carbon atoms, and aliphatic (including alicyclic) glycols or ethers thereof, the aliphatic dimethylene groups having 2 to 24 carbon atoms, and mixtures thereof. Examples of suitable aromatic dicarboxylates include terephthalate, isophthalate, phthalate, naphthalene dicarboxylates and sodiosulfoisophthalate.

Examples of suitable aliphatic dicarboxylates include succinate, glutarate, adipate, azelaiate (from azelaic acid), sebacate, fumarate, maleate (from maleic acid) and itaconate. Examples of suitable alicylic dicarboxylate are 1,4-cyclohexane-dicarboxylate, 1,3-cyclohexane-dicarboxylate and 1,3-cyclopentane-dicarboxylate. Examples of suitable aliphatic dimethylenes include ethylene, propylene, methylpropylene, tetramethylene, pentamethylene, hexamethylene, neopentylene [—$CH_2C(CH_3)_2$—$CH_2$—], 1,4-cyclohexane-dimethylene, 1, 3-cyclohexane-dimethylene, 1,3-cyclopentane-dimethylene, norbornane-dimethylene, —$CH_2CH_2$ ($OCH_2CH_2$)$_n$—, where n is an integer with 1 to 5 being preferred, and mixtures thereof.

Such polyesters are well known in the art and may be produced by well-known techniques, for example, those described in U.S. Pat. Nos. 2,465,319 and 2,901,466.

In a preferred embodiment, the polyester comprises isophthalic monomeric units in a concentration of at least 1 mole %, more preferably with at least 3 mole %, most preferably with at least 5 mole % with respect to the total concentration of dicarboxylate monomer.

Suitable other aliphatic diols are, for example, diethylene glycol, triethylene glycol, aliphatic glycols of the general formula HO—($CH_2$)$_n$—OH, where n is an integer from 3 to 6, in particular propane-1,3-diol, butane-1,4-diol, pentane-1,5-diol and hexane-1,6-diol, or branched aliphatic glycols having up to 6 carbon atoms. Of the cycloaliphatic diols, cyclohexanediols, in particular cyclohexane-1,4-diol may be mentioned. Suitable other aromatic diols correspond, for example, to the formula HO—$C_6H_4$—X—$C_6H_4$—OH, wherein X represents —$CH_2$—, —$C(CH_3)_2$—, —$C(CF_3)_2$, —O—, —S— or —$SO_2$—. In addition, bisphenols of the formula HO—$C_6H_4$—$C_6H_4$—OH are also well suited.

Other aromatic dicarboxylic acids are preferably benzoldicarboxylic acids, naphthalenedicarboxylic acids, for example naphthalene-1,4- or 1,6-dicarboxylic acid, biphenyl-x,x'-dicarboxylic acids, in particular biphenyl-4,4'-dicarboxylic acid, diphenylacetylene-x,x'-dicarboxylic acids, especially diphenylacetylene-4,4'-dicarboxylic acid or stilbene-x,x'-dicarboxylic acids. Of the cycloaliphatic dicarboxylic acids, mention may be made of cyclohexanedicarboxylic acids, in particular cyclohexane-1,4-dicarboxylic acid. Of the aliphatic dicarboxylic acids, the ($C_3$-$C_9$) alkanedioic acids are particularly suitable, the alkane moiety being straight-chain branched.

The polyesters are preferably made by reacting dicarboxylic acid esters and diols, with the known transesterification catalysts, such as zinc, calcium, lithium, magnesium and manganese salts. The intermediates are then polycondensed in the presence of commonly used polycondensation catalysts, such as antimony trioxide or titanium salts. However, the preparation can also be carried out by the direct esterification process in the presence of polycondensation catalysts.

Desirably, the polyester film in the present invention is biaxially oriented from the viewpoint of mechanical characteristics and dimension stability. The term "biaxially oriented" refers to, for example, that an undrawn thermoplastic resin film, in which crystalline orientation is not yet completed, is drawn in each of the longitudinal direction and the lateral direction by about 2.5 to 5.0 times and, thereafter, crystalline orientation is completed.

In a particularly preferred embodiment, the polyester containing film is an axially stretched film comprising a polyester as described above and a polymer selected from the group of a polymethylmethacrylate, a copolymer of acrylonitrile and styrene, a copolymer of acrylonitrile, butadiene and styrene, polyethylene, polypropylene, polymethyl pentene and other polyolefin type resins, ionomer resin EP rubber and other copolymer polyolefin resins, polystyrene, styrene-acrylonitrile copolymers, styrene-butadiene-acrylonitrile copolymers, polycarbonate resins or polyacrylonitrile type resins. More particularly preferred, the polyester containing film is a film consisting essentially of a continuous phase linear polyester matrix having dispersed therein a non-crosslinked random SAN-polymer. Optionally, in that film, dispersed or dissolved therein at least one ingredient from the group of ingredients consisting of inorganic opacifying pigments, whitening agents, colorants, UV-absorbers, light stabilizers, antioxidants and flame retardants. Preferably, the obtained film is white, microvoided, non-transparent and axially stretched. The linear polyester matrix has monomer units consisting essentially of at least one aromatic dicarboxylate, at least one aliphatic dimethylene and optionally at least one aliphatic dicarboxylate. The weight ratio of the linear polyester to the non-crosslinked SAN-polymer is preferably in the range of 2.0:1 to 19.0:1.

The production of a non-transparent microvoided axially stretched film according to the invention, to the present invention, comprises a transverse stretching ratio in the range of from about 2 to about 6, with a range of 2.5 to about 5 being preferred and a range of from about 3 to about 4 being particularly preferred. The higher the stretching ratio, the higher is the opacity. Furthermore, the higher the stretching rate in %/min, the higher the opacity. The axially or biaxially stretched film is finally passed through a second set of hot air heaters which blow hot air at a temperature of between 160 and 240° C. onto the film layers to heat-set or thermofix the film layers. The heat-set temperature must be sufficient to obtain crystallization of the polyester. The preferred heat-set or thermofixation temperature in the case of polyethylene terephthalate or polyethylene naphthalate is at least 140° C. and preferably at least 150° C. and particularly preferably at least 175° C.

Before or after longitudinal stretching a first subbing layer, called a primer layer or addition promoting layer, may be applied to the nonvoided polyester layer by a coating means such as an air knife coating system. The first subbing layer is for example formed from a (meth)acrylate copolymer, a poly(meth)acrylate, a polyurethane, a sulphonated polyester or a chloride containing copolymer such as vinylidene chloride copolymer in latex form having some hydrophilic functionality through the presence of a copolymerized unsaturated carboxylic acid which is applied as an aqueous dispersion.

B. FLAME RETARDANT LAYER

B.1. Colloidal Metal Oxide

Examples of colloidal metal oxide include but are not limited to any metal or metalloid oxide complex that has a substantial number of hydroxyl groups that can form a dispersion in aqueous media. In one embodiment, the binder is preferably colloidal alumina, colloidal silica, colloidal metal oxide where the metal is iron, or a mixture thereof, more preferably colloidal alumina or colloidal silica. Colloidal alumina can be a powder, sol, gel or aqueous dispersion. The colloidal alumina size is preferably from 5 nm to 400 μm, preferably at least 30 wt. % is less than 25 μm and 95 wt. % is less than 100 μm. The colloidal silica is preferably un-calcined with a sufficient number of hydroxyl groups such that the total particle weight loss upon ignition is between from 5% to 37%, more preferably from 20% to 31%. The colloidal silica size is preferably from 5 nm to 250 µm, preferably at least 30 wt. % is less than 25 µm and 95 wt. % is less than 100 µm. In one embodiment, the amount of colloidal metal oxide in the flame retardant layer is 6 g/m$^2$ or more, more preferably 10 g/m$^2$.

B.2. Inorganic Binder

Inorganic binders, suitable as a binder in the flame retardant layer of the invention can be calcium carbonate, a phyllosilicate mineral selected from an antigorite $(Mg_3Si_2O_5(OH)_4)$, a chrysotile $(Mg_3Si_2O_5(OH)_4)$, a lizardite $(Mg_3Si_2O_5(OH)_4)$, a halloysite $(Al_2Si_2O_5(OH)_4)$, an kaolinite $(Al_2Si_2O_5(OH)_4)$, an illite $((K,H_3O) (Al,Mg,Fe)_2 (Si,Al)_4O_{10}[(OH)_2, (H_2O)])$, a montmorillonite $((Na,Ca)_{0.33} (Al,Mg)_2Si_4O_{10}(OH)_2 \cdot nH_2O)$, a vermiculite $((MgFe,Al)_3Al, Si)_4O_{10}(OH)_2 \cdot 4H_2O)$, a talc $(Mg_3Si_4O_{10}(OH)_2)$, a sepiolite $(Mg_4Si_6O_{15}(OH)_2 \cdot 6H_2O)$, a palygorskite $((Mg,Al)_2Si_4O_{10} (OH) \cdot 4(H_2O))$, an attapulgite $((Mg,Al)_2Si_4O_{10} (OH) \cdot 4(H_2O))$, a pyrophyllite $(Al_2Si_4O_{10}(OH)_2)$, a biotite $(K(Mg, Fe)_3 (AlSi_3)O_{10}(OH)_2)$, a muscovite $(KAl_2 (AlSi_3)O_{10} (OH)_2)$, a phlogopite $(KMg_3 (AlSi_3)O_{10}(OH)_2)$, a lepidolite $(K(Li,Al)_{2\_3}(AlSi_3)O_{10}(OH)_2)$, a margarite $(CaAl_2 (Al_2Si_2) O_{10}(OH)_2)$, a glauconite $((K,Na) (Al,Mg,Fe)_2Si,Al)_4O_{10} (OH)_2)$, a chlorite $((Mg,Fe)_3Si,Al)_4O_{10}(OH)_2 \cdot (Mg,Fe)_3 (OH)_6)$, or mixtures thereof.

Other inorganic binders that may be used in the flame retardant layer of the invention include clay binders, such as bentonite, cepiolite, minegel clay and cement binders, particularly calcium aluminate cements.

More preferably, the inorganic binder is a synthetic clay. A synthetic clay may comprise a clay produced synthetically or a natural clay which has been modified, for example, through chemical or physical modification. Examples of modification may include sieving, grinding, purification, or chemical modification. Examples of the synthetic clay may include synthetic hectorite clays and synthetic smectite clays. Examples of synthetic hectorite clays include, but are not limited to, a synthetic hectorite clay having a composition by weight on a dry basis of 59.5% $SiO_2$, 27.5% MgO, 0.8% $Li_2O$ and 2.8% $Na_2O$, a synthetic hectorite clay having a composition by weight on a dry basis of 54.5% $SiO_2$, 26.0% MgO, 0.8% $Li_2O$, 5.6% $Na_2O$ and a 4.1% $P_2O_5$ and synthetic hectorite clay having a composition by weight on a dry basis of 54.5% $SiO_2$, 26.0% MgO, 0.8% $LiO_2O$, 5.6% $Na_2O$, 4.1% $P_2O_5$, and so on. A commercial example of a synthetic hectorite clay is THERMA-VIS™, available from Halliburton Energy Services, Inc. of Houston, Tex. THERMA-VIS is a trademark of Halliburton Energy Services, Inc. Another commercial example of a synthetic smectite clay is LAPONITE®, available from BYK-Gardner GmbH of Geretsried, Germany. LAPONITE® is a registered trademark of BYK-Gardner GmbH.

B.3. Phosphorous Containing Compound

Preferable phosphorous containing compounds to be included in the flame retardant layer of the invention are inorganic phosphorous compounds such as ammonium polyphosphate, phosphoric acid, pyro/poly-phosphoric acid and organic phosphorus compounds such as carboxyphosphinic acids, their anhydrides, aluminum diethylphosphinate, calcium diethylphosphinate, tris(2,3-dibromopropyl) phosphate, tris(1,3-dichloro-2-propyl) phosphate, tetrekis(2-chloroethyl) dichloro-isopentyldiphosphate, tris (1,3-dichloroisopropyl) phosphate, tris(2-chloroisopropyl) phosphate, dimethyl methylphosphonate and combinations thereof.

Other suitable phosphorous containing compounds are water-soluble phosphorous compositions including a phosphonate ester with one or two, 4 to 6 member phosphorus containing ring structures. In one example, the water-soluble phosphorus containing composition can be 5-ethyl-2-methyl-1,3,2-dioxaphosphoranian-5-yl)methyl dimethyl phosphonate P oxide. In another example, the water-soluble phosphorus containing composition can be bis[(-ethyl-2-methyl-1,3,2-dioxaphosphorinan-5-yl)methyl] methyl phosphonate P,P'-dioxide.

B.4. Mineral Compound

Exemplary mineral compounds which may be suitable as a second flame retardant compound include aluminum hydroxide, aluminiumtrihydrate, magnesiumhydroxide, huntite (magnesium calcium carbonate), hydromangesite (hydrated magnesium carbonate), phosphorus, red phosphorus, boehmite (aluminum oxide hydroxide), boron compounds, antimony trioxide or combinations thereof.

B.5. Organic Binders

One of the advantages of the flame retardant layer according to the invention is that the flame retardancy is maintained, even when compounds such as organic binders are added to make the flame retardant layer functional such as printable with inks selected from the group of offset printing inks, flexographic printing inks, inkjet printing inks, screen printing inks and gravure printing inks or printable with xerographic toners.

The flame retardant layer may comprise a latex, the latex being preferably an anionic acrylic latex or a polyurethane latex. Suitable acrylic latexes are polymers or copolymers obtained from following monomers: styrene, 2-ethyl-hexyl acrylate and ammonium acrylate; styrene, α-methyl-styrene and ammonium acrylate; styrene, acrylate and ammonium acrylate; styrene, acrylate and methacrylate; styrene, acrylic acid and acrylonitrile ethyl acrylate N-hydroxy-methyl-acrylamide; styrene and acrylate; vinyl acetate, vinyl versatate and acrylate; cationic monomers, styrene and acrylates; carboxy-modified acrylic monomer; acrylic monomer; carboxy-modified acrylic monomer; acrylate and acrylonitrile. Suitable commercial anionic acrylic latexes are Joncryl FLX5000, Joncryl 8078, Joncryl 8050, Joncryl FLX5010, Joncryl 8385 all from BASF, Hycar PC84 from Dow Chemicals, Carboset GA2364 from Goodrich, Mowilith DM 2452 from Clariant, Wellpur FM10C from Van Camp Chemicals, Jetsize CE225 from Eka Nobel, Hycar 2684, Hycar 2679, Hycar 2671 all from Lubrizol, Impranil DLU, Impranil LP RSC1997, Impranil LP RSC3040, Bayhydrol XP2558, Dispercoll U53 all from Covestro.

Suitable polyurethane latexes are aliphatic polyurethane latices, more preferably anionic polyester polyurethane latices. Commercially available PU-latexes are: Wac-17XC from Takamatu Oil & Fat Co. Ltd, Crom-elastic C4480 from Cromogenia-units S.A., Enorax PU950 from Cellano, Neorez R989 from Avecia.

Preferably the acrylic or aliphatic PU latex is self-crosslinkable: Acronal LR 8977, Acronal S 760, Joncryl 1580, Joncryl 8380, Joncryl 8383, Joncryl 8384, Joncryl 8385, Joncryl 8386, Joncryl 8300, Joncryl 8311, Luhydran S 937 T all from BASF, NeoCryl XK-98, NeoPac R-9029 all from DSM Neo-Resins.

B.6. Conductive Increasing Agents

The flame retardant layer according to the invention may comprise conductivity increasing agents such a conductive polymer to improve the adhesion of toner and hence improve the printability in a xerographic image recording process. A suitable binder is a sulfonated styrene polymer.

B.7. Porous Pigment Particles

To improve ink uptake of the flame retardant layer, porosity can be introduced into the layer. Therefore, porous pigments can be added to the flame retardant layer. Preferable porous pigments are inorganic pigments and include pigments having primary particles having an internal porosity and pigments whose primary particles have no internal porosity and have a specific surface area of at least 100 m$^2$/g, which are present as secondary particles having an internal porosity as a result of the aggregation of the primary particles. Examples of such primary particles are flame pyrolyzed inorganic particles such as the particles in the Aerosil® range produced by Degussa/Evonik.

Examples of suitable porous pigment particles are disclosed in column 12-14 of U.S. Pat. No. 8,974,876B2.

B.8. Additives

The flame retardant layer according to the invention may comprise the following additives: opacifying pigments such as TiO$_2$, CaCO$_3$; water-soluble binders such as a hydrolysed polymer of copolymer of a vinyl ester; insolubilization agents such as formaldehyde, glutaraldehyde, glyoxal-derivatives, dimethylol urea, polyanionic metallic compounds or melamine-formaldehyde resins and matting agents.

C. EXAMPLES

C.1. Materials

All materials were supplied by Acros or Aldrich unless otherwise specified.

Kieselsol 100F is a colloidal silica from HC Starck

Trividasol is a 2.5% water based solution of Tivida FL2500 (weight ratio Fluor surfactant/water/methoxy propanol/ethanol=2.5/67.86/4.64/25)

Laponite RDS is a synthetic clay from BYK-Chemie GmbH

Exolit® AP 420 is an aqueous solution of ammonium polyphosphate from Clariant

Micral® 1500 is an Aluminium hydroxide from J. M. Huber

Micral® 9400 is an Aluminium hydroxide from J. M. Huber

Neocryl XK151 is a polyacrylate binder from DSM

Versa TL77 is a Polystyrene sulphonic acid sodium salt from Nouryon

Diofan A675 is a vinylidene chloridecopolymer from Solvay

Polyester containing film 1: Is the Asteria® XR125.074 film having a thickness of 125 μm and is supplied by Agfa-Gevaert NV.

Polyester containing film 2: Is a PET/SAN (Styrene-Acrylonitrile) synthetic paper, having a thickness of 125 μm and is supplied by Agfa-Gevaert NV under the trade name Essence UV®.

C.2. Measuring Methods

C.2.1. Sample Preparation

Samples of the flame retardant film comprising a flame retardant layer were prepared as follows. The coating composition to prepare the flame retardant layer was prepared by firstly dispersing the second flame retardant to form a 20 wt. % dispersion of the flame retardant compound in water using a stirrer at 1000 rpm for 10 minutes. The flame retardant compound dispersion is then added to the coating composition including the other ingredients using a magnetic stirrer at 400 rpm at room temperature. After the addition of the dispersion, the pH is normally adjusted to a value between 8.0 and 8.5 and the coating composition is further stirred for 10 minutes.

The flame retardant layer was coated on a PET comprising film. The flame retardant layer was coated by means of a coating table (Elcometer 4340). The coating table was preheated to a temperature of 50° C. prior to the coating. The PET comprising films were fixed to the coating table using vacuum pressure, and any air bubbles are removed by flattening the PET-film using a fresh cotton pad for each piece of substrate. The wet thickness of the coating was controlled by the coating bar, which was set to the appropriate thickness that was required. The coating was allowed to stand for approximately 5 minutes until the coating was dry. At this point, the fresh coating was transferred to an oven which had been pre heated to 50° C. The coating was dried for a further 10 minutes at this temperature. After the drying process is complete, samples are cut and labelled so they are prepared for testing.

C.2.2. Flame Tests

Four samples of film material, each 150 mm×100 mm were secured vertically to a metal frame. Then a blue flame originating from a Bunsen burner were directed at the centre of each strip for 3 seconds and the behaviour of the heated film material was visually observed. The visual observation was quantified according a ranking listed in Table 1

TABLE 1

| Visual observation of flame retardancy | Ranking |
| --- | --- |
| Film material does not burn within 3 s | 1 |
| Film material caught fire within 3 s | 2 |

2 samples of each material were tested each time, so that the results could be averaged.

C.2.3. Scratch Resistance

The scratch resistance of the flame retardant layer was measured by means of a scratch pen (TQC Hardness Test 0-300/0-1000/0-300). This pen can be set to give a different force of scratching from 0 N-30 N. An A4 size polyester film with a flame retardant layer at the upper side, was placed on a glass plate, and, after adjusting the force required, the pen was applied in its vertical position to the sheet, and dragged across the sheet. If the flame retardant layer was not removed by the force, a greater force was tested until the layer was removed. The force at which the layer is removed is a measure for the scratch resistance.

C.3. Example 1

In Example 1, the requirement of the presence of a flame retardant being a mineral compound selected from the group of aluminium hydroxide, magnesium hydroxide, magnesium calcium carbonate, hydrated magnesium carbonate, aluminium oxide hydroxide in the flame retardant layer is demonstrated.

Two coating compositions were prepared and coated on the polyester containing film 2 according § C.2.1. The compositions of the flame retardant layers are listed in Table 2.

TABLE 2

| Component | COMP-1 (g/m$^2$) | INV-1 (g/m$^2$) |
|---|---|---|
| Kieselsol 100F | 30 | 12 |
| Exolit AP420 | 20 | 20 |
| Laponite RDS | 5 | 5 |
| Trividasol | 0.05 | 0.05 |
| Micral 9400 | — | 12 |

The results of the flame tests performed according § C.2.2 on the samples obtained with COMP-1 and INV-1 flame retardant layers are summarized in Table 3.

TABLE 3

| Sample | Flame retardancy |
|---|---|
| COMP-1 | 2 |
| INV-1 | 1 |

Table 3 shows that the presence of Aluminium hydroxide (Micral 9400) improves the flame retardancy of the film material considerably.

C.4. Example 2

Example 2 shows which are the minimal amounts required of the compounds making up the flame retardant layer to obtain sufficient flame retardancy of the film.

The coating composition of INV-1 was coated according to § C.2.1 on polyester containing film 2 at different dry coating weights as listed in Table 4. The results of the flame tests according to § C.2.2 are also listed in Table 4.

TABLE 4

| Compound | COMP-2 | INV-2 | INV-3 | INV-4 | INV-5 | COMP-3 |
|---|---|---|---|---|---|---|
| Kieselsol 100F | 4.5 | 10.7 | 12.7 | 15.3 | 24.0 | — |
| Exolit AP420 | 7.2 | 17.1 | 20.4 | 24.6 | 40.0 | 20.0 |
| Laponite RDS | 1.5 | 3.6 | 4.2 | 5.1 | 10.0 | 5.0 |
| Trividasol | 0.03 | 0.03 | 0.06 | 0.09 | 0.12 | 0.05 |
| Micral 9400 | 4.0 | 9.5 | 11.3 | 13.6 | 24.0 | 12.0 |
| Flame retardancy | 2 | 1 | 1 | 1 | 1 | 2 |

The results of Table 4 show that colloidal silica is an essential compound in the flame retardant layer to achieve sufficient flame retardancy and that the amounts of the compounds of the flame retardant layer of COMP-2 are insufficient to provide sufficient flame retardancy to the polyester film 2.

C.5. Example 3

Example 3 shows that an inorganic binder such as a synthetic clay is required to provide sufficient film forming properties to the flame retardant layer.

From the coating composition of INV-1, the Laponite RDS was omitted and the resulting coating composition was coated on a polyester containing film 2 according to § C.2.1. However, no homogeneous film formation was obtained.

From Example 3 it can be concluded that the inorganic binder is essential to achieve a homogeneous flame retardant layer.

C.6. Example 4

Example 4 shows that the addition of organic binders to the flame retardant layer according to the invention to e.g. improve printability, does not decrease the flame retardancy of the flame retardant layer of the invention.

In order to make a layer printable, ink absorptivity and adhesion of electrophotographic toner of the layer should be implemented. This can be achieved by adding acrylate binders and Versa TL77 to the flame retardant layer of the invention. To test the influence of adding these organic binders on flame retardancy, the flame retardant layer from Table 5 was coated on the polyester containing film 2 (=INV-6) and tested for flame retardancy.

TABLE 5

| Compound | g/m$^2$ |
|---|---|
| Kieselsol 100F | 9.0 |
| Exolit AP420 | 14.4 |
| Laponite RDS | 3.0 |
| Trividasol | 0.05 |
| Micral 9400 | 8.0 |
| Versa TL77 | 1.68 |
| Neocryl XK151 | 6.3 |

The flame retardant test according to § C.2.2 revealed a ranking of 1 (=film material does not burn). Hence, it can be concluded from these results that the flame retardant layer can be made printable without losing its flame retardant properties.

C.7. Example 5

In Example 5, it is demonstrated that adding an additional layer to improve e.g. physical properties such as scratch resistance of the flame retardant layer, on top of the flame retardant layer according to the invention, does not decrease the flame retardancy of the film.

On top of the film material obtained in Example 4, a layer having the composition as listed in Table 6 was coated the same way as described in § C.2.1.

TABLE 6

| Compound | Amount (g/m$^2$) |
|---|---|
| Diofan A675 | 0.73 |
| Versa | 0.24 |
| Trividasol | 0.01 |

This sample (INV-7) was tested for flame retardancy and scratch resistance according to § C.2.2 and § C.2.3, and compared with INV-6. The results are summarised in Table 7.

TABLE 7

|  | INV-6 | INV-7 |
|---|---|---|
| Flame retardancy | 1 | 1 |
| Scratch resistance | 15N | 30N |

From the results in Table 7, it can be concluded that providing a layer on top of the flame retardant layer of the invention, improves the scratch resistance significantly without a decrease in flame retardant properties. It should be mentioned that the extra layer thickness due to the presence of the extra layer on top of the flame retardant layer is small with respect to the thickness of the flame retardant layer, hence the influence on the flame retardant properties which is dependent, on the amount of the compounds of the flame retardant layer, can be considered as being negligible.

The invention claimed is:

1. A flame retardant film comprising a polyester containing film comprising a flame retardant layer on a side thereof, the flame retardant layer comprising a colloidal metal oxide in an amount of 6 g/m$^2$ or more, an inorganic binder in an amount of 2 g/m$^2$ or more, a first flame retardant being a phosphorous containing compound in an amount of 10 g/m$^2$ or more, and a second flame retardant being a mineral compound selected from the group consisting of aluminum hydroxide, aluminum trihydrate, magnesium hydroxide, magnesium calcium carbonate, hydrated magnesium carbonate, aluminum oxide hydroxide, boron compounds, antimony trioxide, and combinations thereof, the amount of the second flame retardant is 6 g/m$^2$ or more.

2. The flame retardant film of claim 1, wherein the inorganic binder is a clay binder.

3. The flame retardant film of claim 2, wherein the colloidal metal oxide is a colloidal silica.

4. The flame retardant film of claim 3, wherein the polyester containing film is a biaxially stretched film comprising a styrene acrylonitrile polymer or a syndiotactic polystyrene.

5. The flame retardant film of claim 4, wherein the polyester is polyethylene terephthalate.

6. The flame retardant film of claim 4, wherein the clay is a synthetic smectite clay.

7. The flame retardant film of claim 3, wherein the polyester is polyethylene terephthalate.

8. The flame retardant film of claim 3, wherein the clay is a synthetic smectite clay.

9. The flame retardant film of claim 3, wherein the flame retardant layer comprises an organic binder which is an acrylic latex or a polyurethane latex in an amount of 5 g/m$^2$ or more.

10. The flame retardant film of claim 3, wherein an ink receiving layer is present on top of the flame retardant layer.

11. The flame retardant film of claim 2, wherein the polyester containing film is a biaxially stretched film comprising a styrene acrylonitrile polymer or a syndiotactic polystyrene.

12. The flame retardant film of claim 2, wherein the polyester is polyethylene terephthalate.

13. The flame retardant film of claim 2, wherein the clay is a synthetic smectite clay.

14. The flame retardant film of claim 1, wherein the colloidal metal oxide is a colloidal silica.

15. The flame retardant film of claim 1, wherein the polyester containing film is a biaxially stretched film comprising a styrene acrylonitrile polymer or a syndiotactic polystyrene.

16. The flame retardant film of claim 1, wherein the polyester is polyethylene terephthalate.

17. The flame retardant film of claim 1, wherein the flame retardant layer comprises an organic binder which is an acrylic latex or a polyurethane latex in an amount of 5 g/m$^2$ or more.

18. The flame retardant film of claim 17, wherein the flame retardant layer comprises at least 0.5 g/m$^2$ of electrical conductive polymer.

19. The flame retardant film of claim 1, wherein an ink receiving layer is present on top of the flame retardant layer.

20. The flame retardant film of claim 19, wherein the ink receiving layer comprises a polyvinylidene chloride.

* * * * *